(12) United States Patent
Baker et al.

(10) Patent No.: US 8,358,359 B2
(45) Date of Patent: Jan. 22, 2013

(54) REDUCING MOTION-RELATED ARTIFACTS IN ROLLING SHUTTER VIDEO INFORMATION

(75) Inventors: Simon J. Baker, Medina, WA (US);
Eric P. Bennett, Bellevue, WA (US);
Sing Bing Kang, Redmond, WA (US);
Richard Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 12/690,929

(22) Filed: Jan. 21, 2010

(65) Prior Publication Data

US 2011/0176043 A1   Jul. 21, 2011

(51) Int. Cl.
*H04N 5/217* (2011.01)
*H04N 11/00* (2006.01)
*H04N 7/00* (2006.01)
*G06K 9/40* (2006.01)

(52) U.S. Cl. ............ 348/241; 348/497; 382/275

(58) Field of Classification Search .................. None
See application file for complete search history.

(56) References Cited

U.S. PATENT DOCUMENTS

| 6,809,758 B1* | 10/2004 | Jones .................... 348/208.99 |
| 7,129,983 B2 | 10/2006 | Rantanen et al. |
| 7,596,310 B2 | 9/2009 | Ono et al. |
| 7,720,309 B2* | 5/2010 | Sasaki et al. ............... 382/295 |
| 2009/0073305 A1 | 3/2009 | Yuba et al. |
| 2009/0152664 A1 | 6/2009 | Klem et al. |
| 2009/0160957 A1* | 6/2009 | Deng et al. ............ 348/208.99 |
| 2009/0201383 A1* | 8/2009 | Slavin .................... 348/222.1 |
| 2009/0205088 A1 | 8/2009 | Crampton et al. |

FOREIGN PATENT DOCUMENTS

WO   2007045714 A1   4/2007

OTHER PUBLICATIONS

"Compression Advantages of Pixim's Digital Pixel System Technology," retrieved at <<http://netcentricsecurity.com/~/media/SEC/NCS/Whitepapers/2009/03/Pixim_CompressionAdvantages_0.ashx>>, Pixim, Inc., Mountain View, CA, 2008, 11 pages.
Irani, et al., "Super Resolution from Image Sequence," retrieved at <<http://www.cs.huji.ac.il/~peleg/papers/icpr90-Super-ResolutionSequences.pdf>>, Proceedings of the 10th International Conference on Pattern Recognition, 1990, vol. 2, pp. 115-120.
Atienza, David, "Removal of Image Artifacts in CMOS Cameras for iPhone 3GS," retrieved at <<http://esl.epfl.ch/webdav/site/esl/shared/StdProjects/SemProject09-10-CameraArtifactsEmbeddedSystem.pdf>>, Embedded Systems Laboratory, accessed on Dec. 16, 2009, 1 page.

(Continued)

*Primary Examiner* — Albert Cutler
(74) *Attorney, Agent, or Firm* — Microsoft Corporation

(57) ABSTRACT

A system is described for reducing artifacts produced by a rolling shutter capture technique in the presence of high-frequency motion, e.g., produced by large accelerations or jitter. The system operates by computing low-frequency information based on the motion of points from one frame to the next. The system then uses the low-frequency information to infer the high-frequency motion, e.g., by treating the low-frequency information as known integrals of the unknown underlying high-frequency information. The system then uses the high-frequency information to reduce the presence of artifacts. In effect, the correction aims to re-render video information as though all the pixels in each frame were imaged at the same time using a global shutter technique. An auto-calibration module can estimate the value of a capture parameter, which relates to a time interval between the capture of two subsequent rows of video information.

20 Claims, 8 Drawing Sheets

OTHER PUBLICATIONS

Ait-Aider, et al., "Kinematics from Lines in a Single Rolling Shutter Image," retrieved at <<http://www.lasmea.univ-bpclermont.fr/Personnel/Adrien.Bartoli/Publications/AitAider_Bartoli_Andreff_CVPR07.pdf>>, Proceedings of CVPR, 2007, Jun. 2007, 6 pages.

Baker, et al., "Limits on Super-Resolution and how to Break Them," retrieved at <<http://www.ri.cmu.edu/pub_files/pub3/baker_simon_2002_4/baker_simon_2002_4.pdf>>, IEEE Transactions on Pattern Analysis and Machine Intelligence, vol. 24, No. 9, Sep. 2002, 37 pages.

Black, et al., "The Robust Estimation of Multiple Motions: Parametric and Piecewise-Smooth Flow Fields," retrieved at <<http://vision.ucsd.edu/~sagarwal/exam/black_anandan_1996.pdf>>, Computer Vision and Image Understanding, vol. 63, No. 1, Jan. 1996, pp. 75-104.

Bradley, et al., "Synchronization and Rolling Shutter Compensation for Consumer Video Camera Arrays," retrieved at <<http://www.cs.ubc.ca/labs/imager/tr/2009/Bradley-PROCAMS-2009/CamSyncPaperFinal.pdf>>, IEEE Computer Society Conference on Computer Vision and Pattern Recognition Workshops, Jun. 2009, 8 pages.

Fergus, et al., "Removing Camera Shake from a Single Photograph," retrieved at <<http://www.cs.nyu.edu/~fergus/papers/deblur_fergus.pdf>>, ACM Transactions on Graphics, vol. 25, No. 3, 2006, 8 pages.

Liang, et al., "Analysis and Compensation of Rolling Shutter Effect," retrieved at <<http://ieeexplore.ieee.org/stamp/stamp.jsp?arnumber=04549748>>, IEEE Transactions on Image Processing, Aug. 2008, vol. 17, No. 8, pp. 1323-1330.

Liu, et al., "Context Preserving Warps for 3D Video Stabilization," retrieved at <<http://pages.cs.wisc.edu/~fliu/project/3dstab.htm>>, Proceedings of SIGGRAPH 2009, 9 pages.

Lowe, David. G, "Distinctive Image Features from Scale-Invariant Keypoints," retrieved at <<http://people.cs.ubc.ca/~lowe/papers/ijcv04.pdf>>, International Journal of Computer Vision, vol. 60, No. 2, Nov. 2004, 28 pages.

Geyer, et al., "Geometric Models of Rolling-Shutter Cameras," retrieved at <<http://robotics.eecs.berkeley.edu/ ~sastry/pubs/Pdfs%20of%202006/MeingastGeometric2006.pdf>>, 6th Workshop on Omnidirectional Vision, 2005, 8 pages.

Nicklin, et al., "Rolling Shutter Image Compensation," retrieved at <<http://www.springlink.com/content/r51t32gI07qt1pp/fulltext.pdf>>, Proceedings of RoboCup 2006, LNAI, 4434, 2007, pp. 402-409.

"Flip Video Camcorder," retrieved at <<http://www.theflip.com/en-us/>>, retrieved on Dec. 15, 2009, Cisco Systems, Inc., San Jose, CA, 1 page.

"Red Digital Cinema," retrieved at <<http://www.red.com>>, retrieved on Dec. 15, 2009, home page, Red Digital Cinema Camera Company, Lake Forest, CA, 1 page.

Shechtman, et al., "Space-time Super Resolution," retrieved at <<http://www.cs.ucf.edu/courses/cap6412/spr2005/space_time_jrn.pdf >>, IEEE Transactions on Pattern Analysis and Machine Intelligence, vol. 27, No. 4, Apr. 2005, pp. 531-545.

"Rolling Shutter," Wikipedia.org entry, retrieved at <<http://en.wikipedia.org/wiki/Rolling shutter>>, retrieved on Dec. 15, 2009, Wikipedia.org, 2 pages.

Ait-Aider, et al., "Structure and Kinematics Triangulation with a Rolling Shutter Stereo Rig," retrieved at <<http://www.lasmea.univ-bpclermont.fr/Personnel/Francois.Berry/document/iccv09.pdf>>, ICCV 2009, 2009, 6 pages.

* cited by examiner

Provide Corrected Video Information

START — 900

Determine Intersection Time ($t_{int}$) for a Global Shutter Pixel Path
902

Determine ($x$, $y$) Location in a Rolling Shutter Image Based on the Intersection Time
904

Determine an Image Value at Location ($x$, $y$) (e.g., via Interpolation), for Use as the Global Shutter Pixel
906

END

REDUCING MOTION-RELATED ARTIFACTS IN ROLLING SHUTTER VIDEO INFORMATION

BACKGROUND

Many video cameras use CMOS image sensors. Presently, most CMOS sensors capture video information using a rolling shutter technique. This technique entails capturing a frame of video information on a line-by-line basis, such as a row-by-row basis. More specifically, the rolling shutter technique begins the exposure of each line slightly after the exposure of a previous line. Further, the technique reads the video information for each line slightly after reading a previous line. In contrast, a global shutter technique exposes each line of a frame at the same time.

The temporally-staggered capture of video information in the rolling shutter technique can cause three main types of artifacts: (1) partial exposure; (2) shear or skew; and (3) wobble. Partial exposure occurs when a rolling shutter camera attempts to capture a fast-changing illumination, such as a flash, a strobe light, or lightning strike. Shearing occurs when the camera undergoes a constant (or smoothly varying) motion. Wobble occurs when the camera undergoes large accelerations, such as when the camera captures image information while mounted on a vehicle that undergoes high-frequency agitation. Wobble can also occur when the camera captures a scene that contains high-frequency motion.

In all categories of such artifacts, the camera is attempting to capture a frame of image information while a scene is undergoing a change (either because the scene is changing or the camera is being moved). Motion-related artifacts sometimes exhibit a so-called jelly effect, in which objects in the video information appears non-rigid (e.g., spatially warped). For example, straight lines in a scene appear as curved lines, which is particularly evident in the video information (in contrast to an individual frame).

Techniques exist for correcting artifacts attributed to shearing-type motion. For example, shearing can be corrected by computing a global motion associated with the video information and then warping its frames in an appropriate manner. But artifacts associated with high-frequency motion present a more complex problem, for which no satisfactory solution currently exists.

SUMMARY

A system is described for reducing artifacts in video information that has been captured using a rolling shutter technique. The artifacts may originate from the occurrence of high-frequency motion during the capture of the video information. In one illustrative approach, the system operates in three phases. First, the system extracts low-frequency information from the input video information. The low-frequency information describes low-frequency motion exhibited in the input video information. Second, the system infers high-frequency information from the low-frequency information. The high-frequency information describes high-frequency movement associated with the input video information. Third, the system can correct the input video information based on the high-frequency information, to thereby reduce the artifacts in the input video information.

According to one illustrative aspect, the operation of determining the low-frequency information can entail determining the movement of points from one frame of the input video information to the next. That movement information comprises the low-frequency information. The system can use different techniques to extract the low-frequency information, such as a feature-tracking technique, an optical flow technique, etc.

According to another illustrative aspect, the operation of determining the high-frequency information can entail formulating the low-frequency information as measurement constraints. These measurement constraints express known values of integrals of underlying unknown high-frequency information. The system can then formulate an energy function that includes at least one term that is based on the measurement constraints, optionally together with at least one regularization term. The system can then use an optimization technique to determine the high-frequency information by operating on the energy function.

According to another illustrative aspect, the system's operation is governed by a motion model. The motion model expresses a type (or types) of motions that may be present in the input video information. One motion model expresses translational motion. A second motion model expresses affine motion. A third motion model expresses the presence of independently moving objects.

According to another illustrative aspect, the system's operation is governed by a camera capture model, which characterizes the manner in which the camera captures video information. In one case, the camera capture model is specified by a capture parameter which defines a time interval between the capture of two successive lines of video information in a frame.

According to one illustrative implementation, the system provides a calibration module which determines an appropriate value for the capture parameter. The calibration module operates by generating a plurality of corrected results for different respective capture parameter values. The calibration module then assesses an extent to which motion in each of the corrected results diverges from translational motion. Based on this analysis, the calibration module chooses a capture parameter value that yields a correction result that is deemed satisfactory.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative system for reducing artifacts in video information captured via a rolling shutter technique. Some of the artifacts may originate from high-frequency motion during the capture of the video information. Section B describes illustrative methods which explain the operation of the system of Section A. Section C describes illustrative processing functionality that can be used to implement any aspect of the features described in Sections A and B.

Figure 11:
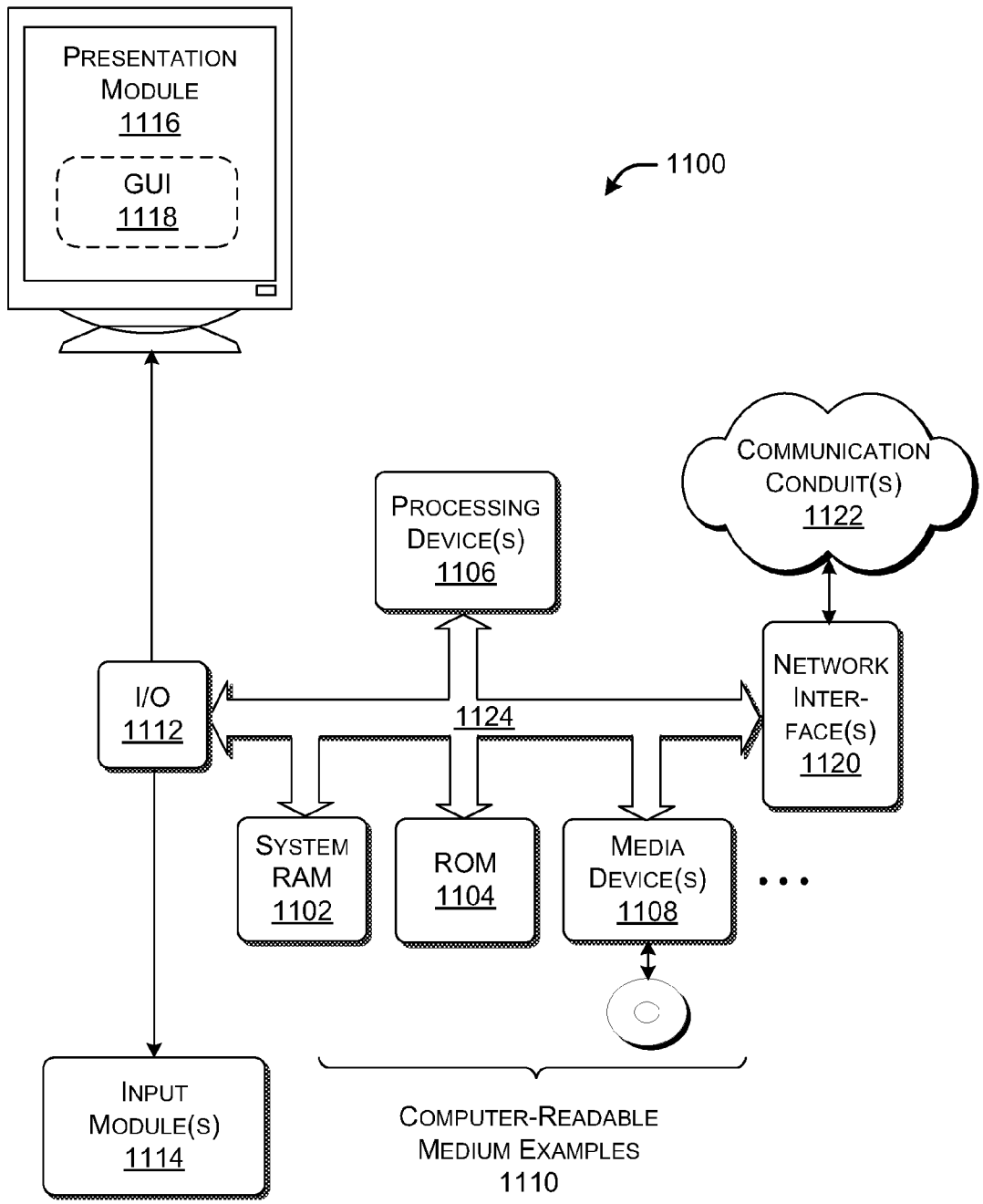
FIG. 11 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 11, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Systems

Figure 1:
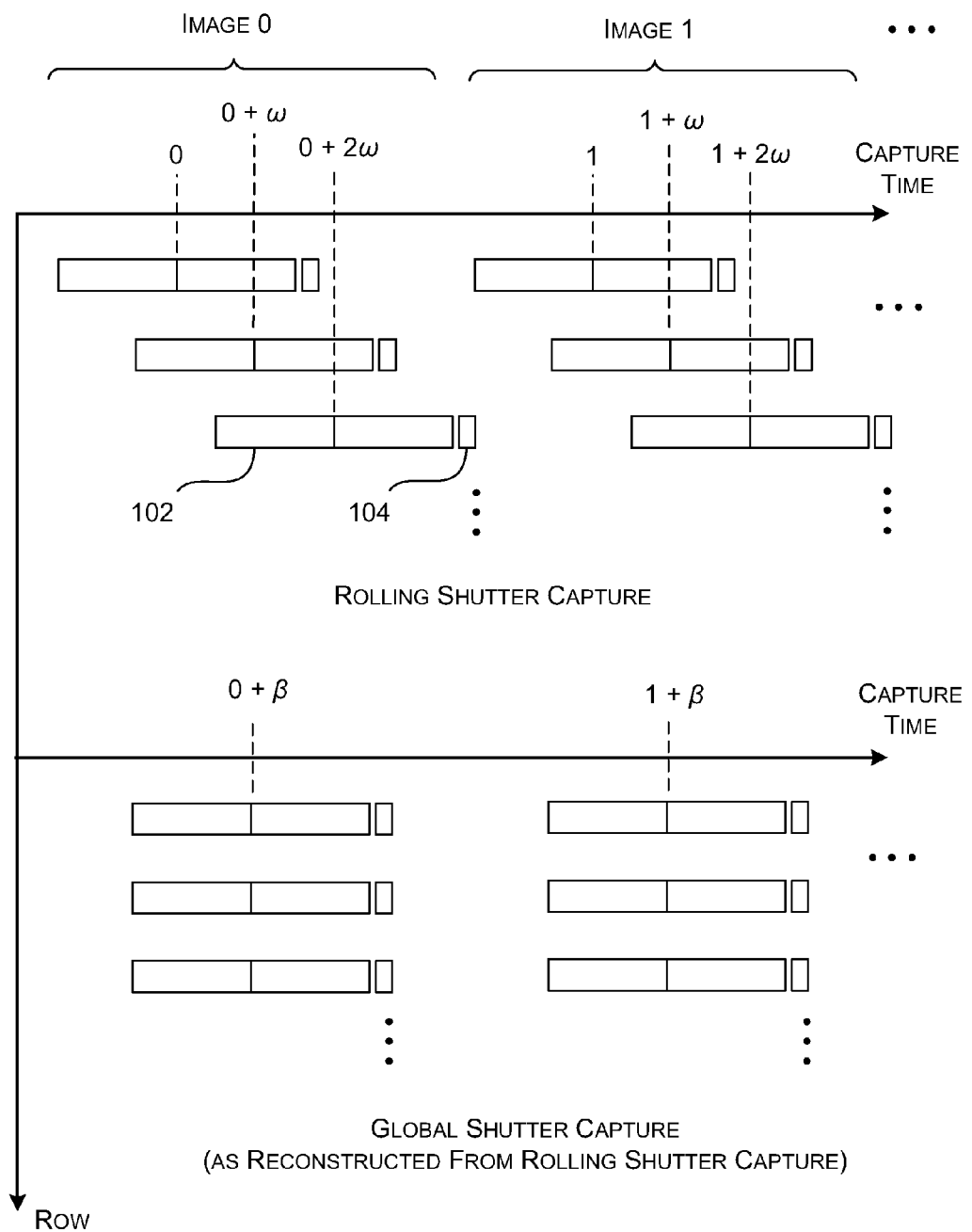
FIG. 1 is a timing diagram that describes image capture for a rolling shutter technique and a global shutter technique.

To begin with, FIG. 1 illustrates one way of conceptualizing the operation of the system described herein. The system accepts input video information that has been captured by a rolling shutter technique. The input video information may include artifacts associated with the presence of high-frequency motion during the capture of the video information. For instance, that high-frequency motion may originate from large accelerations, and/or jitter, and/or from some other phenomenon. The system performs a correction on the input video information to produce output video information that simulates video information that would have been captured using a global shutter technique. Through this process, the system reduces the artifacts in the input video information.

More specifically, FIG. 1 illustrates the capture process performed by the rolling shutter technique (in the top portion of the figure) and the capture process performed by the global shutter technique (in the bottom portion of the figure). Presume that, in both cases, a camera captures video information having a temporally arranged series of frames (also referred to as images). Each frame has a plurality of lines, such as, in this case, a plurality (M) of rows. Each row has a plurality of pixels associated therewith. In each case, the video camera reads a row of video information using an exposure phase and a read out phase (for example, as illustrated by the exposure phase 102 and read out phase 104 of a particular row of a frame). However, for modeling purposes, it is assumed that the camera captures each row of video information at the same time, e.g., a point in time corresponding to the middle of the exposure phase.

In the rolling shutter technique, the camera begins the exposure phase for a row a short time after the start of the exposure time for an immediately preceding row. Further, the camera reads out each row a short time after reading out the preceding row. A capture parameter $\omega$ describes the interval between the capture of two subsequent rows as a fraction of the time between two subsequent frames. As such, for a first frame (image 1), a first row is captured at time 0, a second row is captured at time 0+$\omega$, a third row is captured at time 0+2$\omega$, and so on.

In the global shutter technique, by contrast, the camera captures and reads out each row at the same time. FIG. 1 uses a global shutter timing parameter $\beta$ to temporally place the frames associated with the global shutter technique with reference to each of the corresponding frames associated with rolling shutter technique. Since the system is simulating global shutter video information from rolling shutter video information, it can select an arbitrary timing parameter $\beta$. In one case, the system centers a global shutter frame relative to a corresponding rolling shutter frame such that the global shutter frame is positioned midway through the capture of the rolling shutter frame, e.g., $\beta=\omega(M-1)/2$. This choice of timing parameter $\beta$ is beneficial because it minimizes the maximum correction performed by the correction process; this choice further means that the center of a frame of reconstructed global shutter video information will require the least correction.

More formally stated, assume that a video camera that uses the rolling shutter technique captures input video information, also known as rolling shutter (RS) video information $I_T^{RS}(X, Y)$. The symbol T represents a frame number associated with the video information. The symbols X and Y represent row and column numbers within that frame. (Generally, this explanation uses upper case symbols to denote integers and lower case symbols to denote continuous variables.) The system operates on the input video information $I_T^{RS}(X, Y)$ to generate output video information, also known as global shutter (GS) video information $I_T^{GS}(X, Y)$. The system aims to correct the rolling shutter video information $I_T^{RS}(X, Y)$ to simulate a sequence of global shutter frames $I_T^{GS}(X, Y)$ that might have been captured by a camera that uses the global shutter technique.

The system is effective in correcting at least some motion-related artifacts in the input video information $I_T^{RS}(X, Y)$. For example, consider the case in which the camera that is used to capture the video information is mounted on a vehicle that is vibrating at a high frequency. Assume further that the movements that affect the camera occur at a higher rate than the rate at which the camera captures rows of video information. If so, the frames produced thereby can be expected to contain jelly-like artifacts. Such artifacts are manifest in the video information as objects that appear non-rigid (e.g., spatially warped). The system can reduce (or entirely remove) this type of artifact. The system can also reduce artifacts that originate from high frequency motion in the scene being captured. Hence, generally, the system is effective in reducing wobble-type artifacts. The system is also effective in reducing shear-type artifacts.

Figure 2:
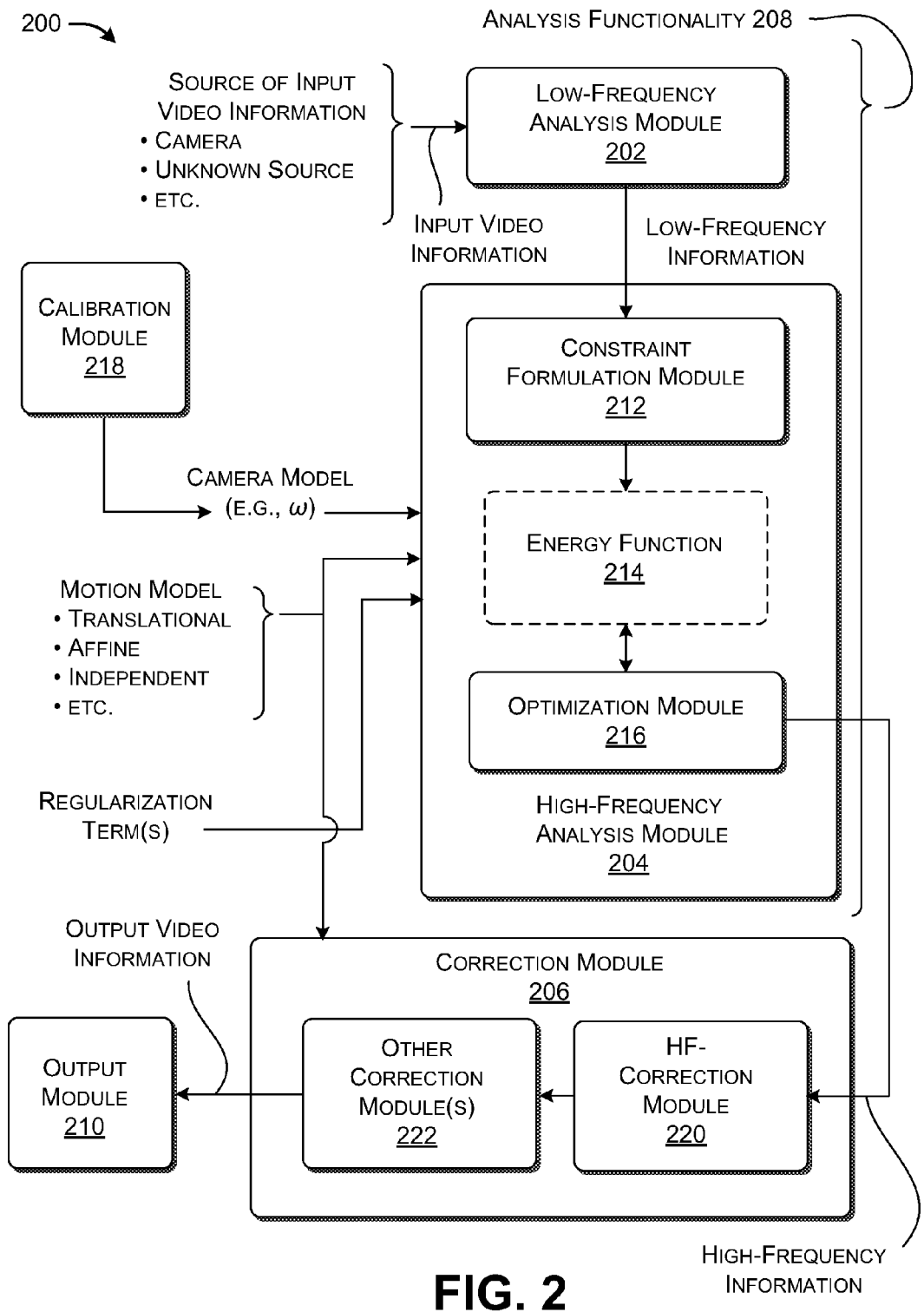
FIG. 2 shows an illustrative system for reducing artifacts in video information that are attributed to the use of the rolling shutter technique.

FIG. 2 shows an overview of a system 200 for accomplishing the above-stated objectives, namely for transforming rolling shutter video information $I_T^{RS}(X, Y)$ into global shutter video information $I_T^{GS}(X, Y)$. Section A provides an overview of the operations performed by the system 200. Section B provides additional details regarding the operations.

The system 200 can include (or can be conceptualized as including) three main components: a low-frequency analysis module 202; a high-frequency analysis module 204; and a correction module 206.

The low-frequency analysis module 202 receives input video information $I_T^{RS}(X,Y)$ from any source of video information. In one case, the source of such video information corresponds to an identifiable camera which is known to use the rolling shutter technique to capture video information. In another case, the source of the video information is unknown, but this video information contains motion-related artifacts which appear to be consistent with the use of a rolling shutter capture technique.

The low-frequency analysis module 202 operates on the input video information to extract low-frequency information that describes low-frequency motion within the input video information. More specifically, the low-frequency analysis module 202 can identify the movements of points in the input video information from one frame to the next. This type of movement is captured on a per-frame level of granularity, and is therefore characterized as low-frequency motion. In the interval between any two frames, the camera (or the scene) may have undergone more detailed movement that is not directly represented by the low-frequency information. This more detailed movement is associated with so-called high-frequency information.

More specifically, a camera captures frames of video information at a given sampling rate, such as, in one non-limiting case, 25-30 Hz. The low-frequency analysis module 202 detects motion that is directly revealed by the video information, e.g., by detecting changes that occur from one frame of the video information to the next (at the level of granularity of the camera's sampling rate). This motion constitutes low-frequency motion. High-frequency motion comprises any motion that the camera, because of its limited sampling rate, is unable to directly capture. As stated above, the high-frequency motion encompasses motion that happens "between" the frames. However, the system 200 can probabilistically estimate the high-frequency motion through analysis of the low-frequency motion that was captured by the camera, in combination with a motion model. In this explanation, the term low-frequency information refers to any information that describes low-frequency motion. The term high-frequency information refers to any information that describes high-frequency motion.

The high-frequency analysis module 204 operates on the low-frequency information (which describes low-frequency motion) to probabilistically estimate the high-frequency information (which describes high-frequency information). As will be described in detail in Section B, the high-frequency analysis module 204 performs this task by treating the low-frequency motion as known evidence for the aggregate (integral) effects of the underlying high-frequency motion. Thus, the high-frequency analysis module 204 can be said to infer the high-frequency information (high-frequency motion) from the low-frequency information (low-frequency motion), even though the high-frequency information is not directly expressed by the low-frequency information. To perform this task, the high-frequency analysis module 204 can use an energy minimization approach to iteratively estimate the high-frequency motion based on the given low-frequency information. The low-frequency analysis module 202 and the high-frequency analysis module 204 collectively constitute analysis functionality 208.

The correction module 206 uses the high-frequency information to remove motion-related artifacts in the input video information, including wobble-type artifacts and shear-type artifacts. The correction module 206 can send the thus-processed video information to an output module 210. The output module 210 can represent any mechanism that visually presents the output video information, such as a display device of any type, a projector device, a printer device, etc. Alternatively, or in addition, the output module 210 may be implemented as a data store that retains the output video information.

More specifically, as to the high-frequency analysis module 204, this component may include a constraint formulation module 212 which formulates the low-frequency information into a plurality of measurement constraints. An energy function 214 includes at least one term that is based on these measurement constraints, along with, optionally, one or more regularization terms. An optimization module 216 iteratively operates on the energy function 214 to reduce an energy metric generated by the energy function 214, or to achieve some other optimization goal. In doing so, the optimization module 216 generates the high-frequency information. In one approach, the optimization module 216 can use a linear programming technique to operate on the energy function 214.

The energy function 214 (which encompasses the measurement constraints provided by the constraint formulation module 212) is governed by a motion model. The motion model expresses a type (or types) of motion that may be present in the input video information. A first motion model expresses the presence of translational motion. In this case, at any given time t, all of the points in a frame are considered to be moving in the same global manner; however, this global movement may change in a continuous manner as a function of time. This means that all of the points in a row have the same translational movement, although points in a subsequent row within the same frame can have a different translational movement (because different rows are captured at different respective times). A second motion model expresses the presence of affine motion in the video information. In this case, at any given time, all the points in the frame may not be moving in the same manner, but their movement is dependent and can be described by a given set of parameters; this type of movement encompasses motion associated with rotation, zoom, etc. A third motion model expresses the presence of independent movement of objects. In this case, at any given time, all the points in the frame may be moving in an independent manner. Other motion models can express features associated with any combination of the first through third motion models. As will be described in detail in Section B, the terms used in the energy function 214 depend on the motion model that is being used. Further, the operation of the correction module 206 may depend on the motion model that is being used.

The energy function 214 is also governed by a camera model. The camera model characterizes the manner in which a camera captures the input video information. In one example, the camera model is specified by the capture parameter ω which defines a time interval between the capture of two successive lines of video information in a frame. As will be described, the system 200 is relatively robust to different selections of the capture parameter ω.

A calibration module 218 can be used to select a suitable value for the capture parameter ω. The calibration module 218 operates by generating a plurality of corrected results for different respective capture parameter values. That is, the calibration module 218 can instruct the system 200 to process a video segment of any length for different capture parameter values. The calibration module 218 then assesses the extent to which motion in each of the corrected results (or in a sample portion thereof) diverges from translational motion. Based on this analysis, the calibration module 218 chooses a capture parameter that yields a correction result that is deemed to be satisfactory.

As to the correction module 206, this component can include a high-frequency (HF) correction model 220 for correcting wobble-type and shear-type artifacts present in the input video information (for example). In doing so, the HF-correction module constructs simulated global shutter video information $I_T^{GS}(X,Y)$ from the rolling shutter video information $I_T^{RS}(X,Y)$. This high-frequency correction may not remove all artifacts associated with the video information. As such, the correction module 206 can include any other correction module (or modules) 222. Such other correction module(s) 222 can perform correction according to any technique or combination of techniques, such as any image stabilization technique.

The system 200 of FIG. 2 can be implemented in any manner. For instance, the system 200 can be implemented at a single site or distributed in multiple parts over plural sites. In one case, the system 200 can be implemented using discrete hardware processing components. In another case, the system 200 can be implemented using software components; in that case, the operations described herein can be implemented by one or more processor devices in the course of executing machine-readable instructions that are stored in any type of memory. In another case, the system 200 can be implemented using a combination of hardware components and software-implemented components. In one case, at least part of the system 200 can be implemented using one or more computer devices of any type, such as the processing functionality described in Section C. This type of functionality can be: a) entirely integrated with a camera which generates the video information to be corrected; or b) entirely separate from the camera; or c) partially integrated with the camera.

B. Illustrative Processes

Figure 3:
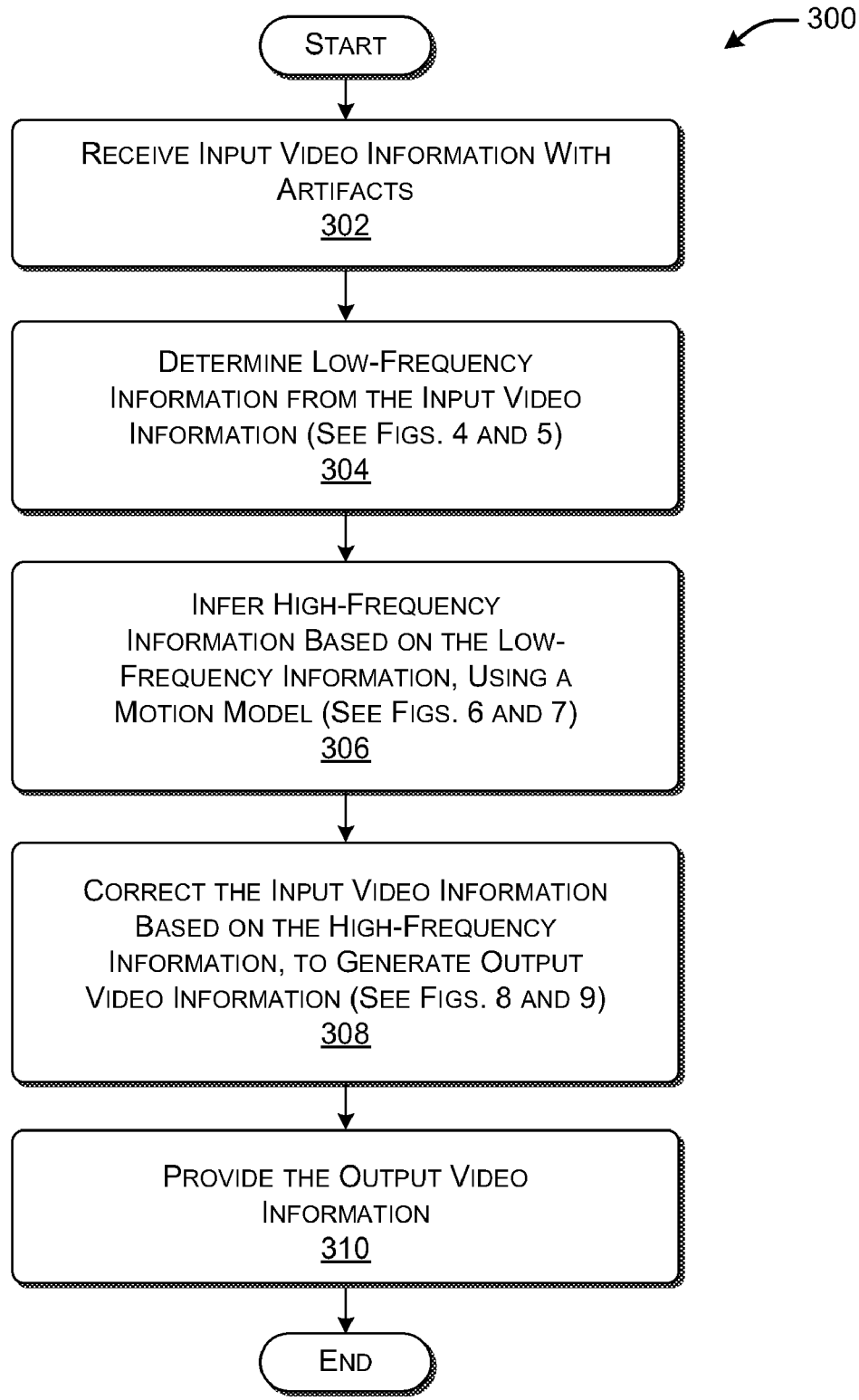
FIG. 3 is an illustrative procedure that describes, in overview, one manner of operation of the system of FIG. 2.

FIGS. 3-10 show illustrative procedures that implement the operations summarized above, together with illustrative examples. To begin with, FIG. 3 shows a procedure 300 which provides an overview of one manner of operation of the system 200.

In block 302, the system 200 receives input video information $I_T^{RS}(X,Y)$ from any known or unknown source of such video information. The video information may include artifacts associated with high-frequency motion that is present during the capturing of the video information.

Figure 4:
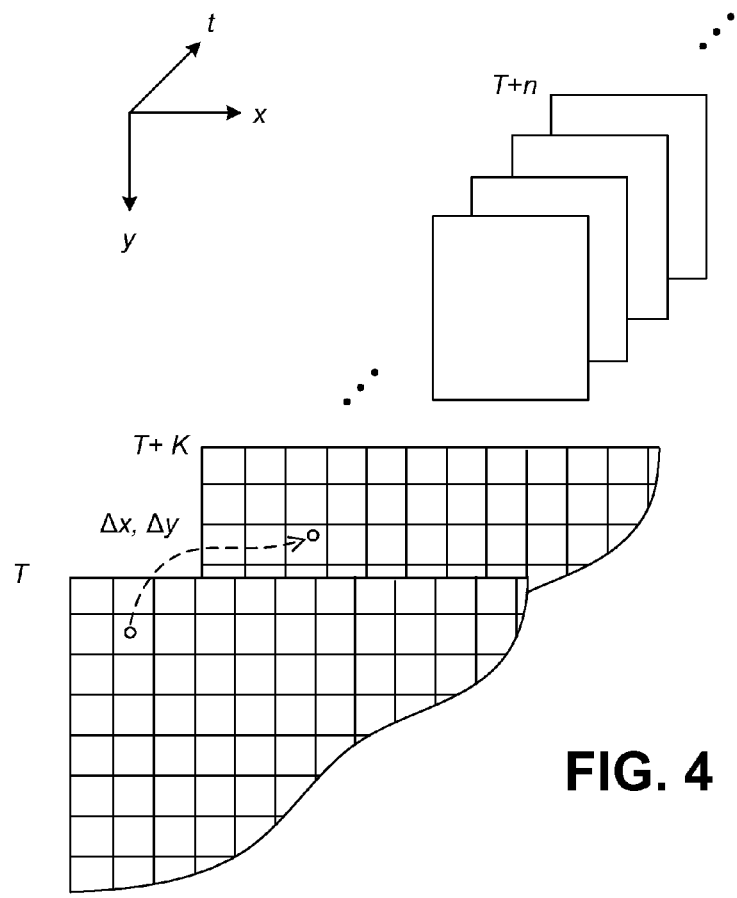
FIG. 4 shows a series of frames of video information, highlighting the movement of a point from a first frame to a second frame.
Figure 5:
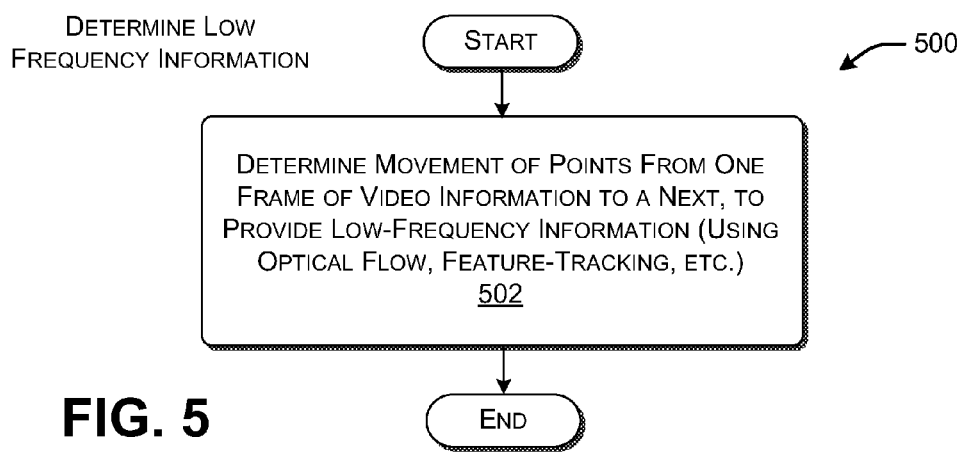
FIG. 5 is an illustrative procedure for determining low-frequency information in input video information.

In block 304, the system 200 determines low-frequency information that describes low-frequency motion in the input video information. FIGS. 4 and 5 present illustrative detail on this operation.

Figure 6:
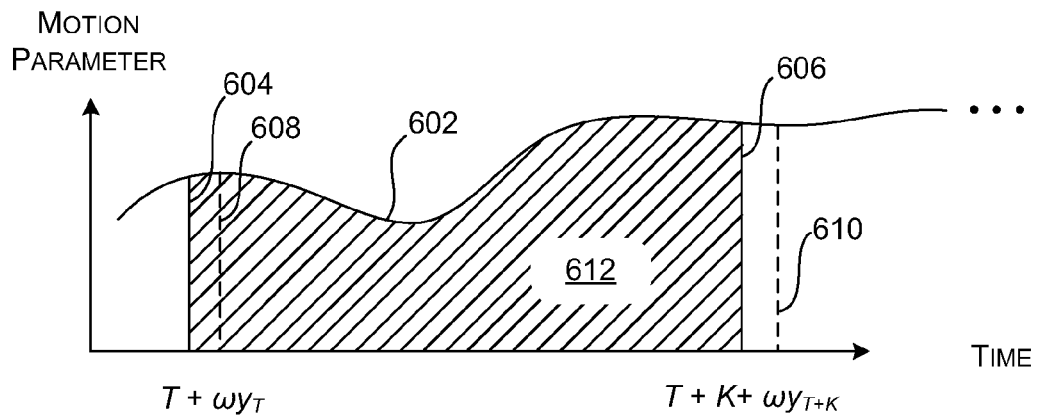
FIG. 6 is a plot that shows a path associated with high-frequency motion, for use in explaining how the system of FIG. 1 can use low-frequency information to infer high-frequency detail.
Figure 7:
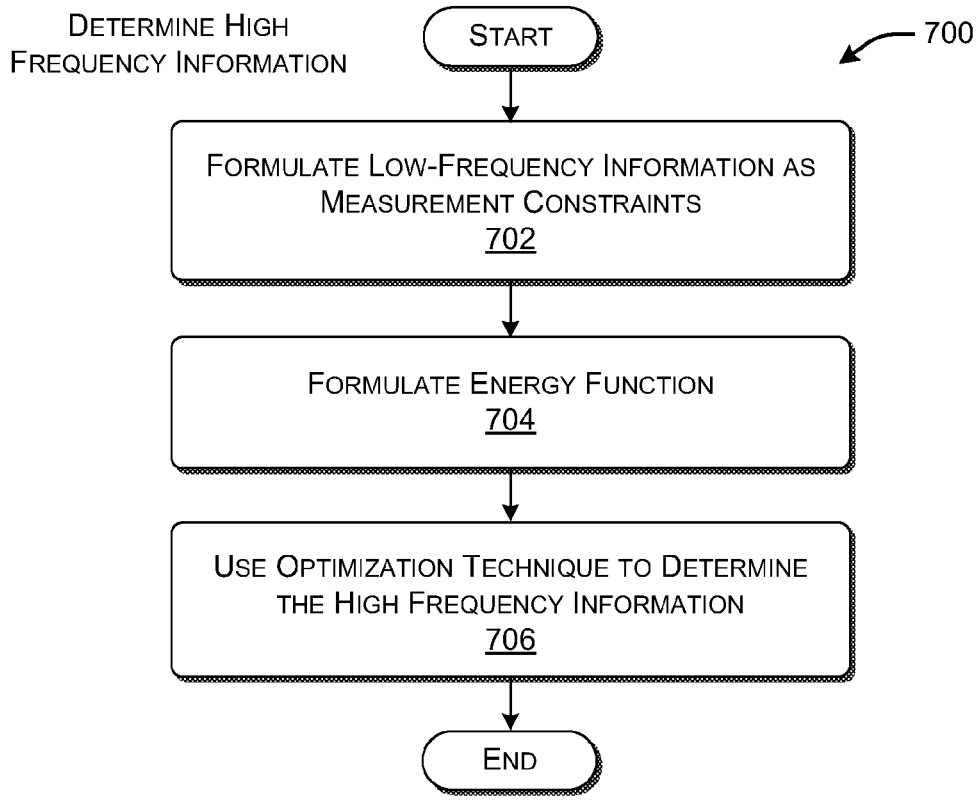
FIG. 7 is an illustrative procedure for determining high-frequency information based on low-frequency information, as governed by a motion model.

In block 306, the system 200 infers high-frequency information from the low-frequency information, as governed a motion model and a camera model. FIGS. 6 and 7 present illustrative detail on this operation.

Figures 8, 9:
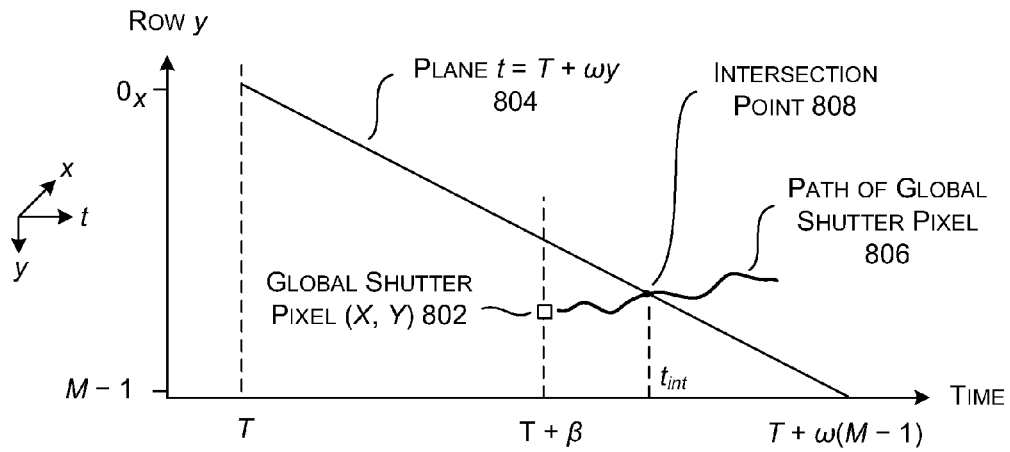
FIG. 8 is a plot that illustrates one technique for determining a global shutter pixel based on pixels captured using a rolling shutter technique.
FIG. 9 is an illustrative procedure for correcting input video information based on high-frequency information.

In block 308, the system 200 corrects the input video information based on the high-frequency information. This block 308 has the effect of transforming the rolling shutter video information $I_T^{RS}(X,Y)$ into global shutter video information $I_T^{RS}(X,Y)$. FIGS. 8 and 9 present illustrative detail on this operation.

In block 310, the system 200 outputs the video information produced in block 308 to any output module 210 or combination of output modules.

The procedure 300 can be expedited using various acceleration techniques. For example, in one approach, the system 200 can down-sample the input video information and then use that down-sampled video information to determine the low-frequency motion and the high-frequency motion. The system 200 can then up-sample the high-frequency motion to the original resolution of the input video information. This provision expedites analysis because the analysis functionality 208 is given less data to process. The down-sampling and up-sampling can alternatively, or in addition, be performed on a more selective basis for any individual operation (or operations) shown in the procedure 300.

B.1. Illustrative Low-Frequency Analysis

FIGS. 4 and 5 provide additional detail regarding one illustrative implementation of block 304 of FIG. 3, as performed by the low-frequency analysis module 202 of FIG. 2. In this explanation, the term "point" broadly represents any location within an image, which may be expressed in real value from. The term "pixel" represents a discrete element in the image, the location of which can be expressed in integer form. To simplify explanation, the term point is more generally used in a broad sense as encompassing both real-valued locations and pixels.

Beginning with FIG. 4, this figure shows a series of frames in the input video information. The low-frequency analysis module 202 tracks the motion of points (e.g., real-valued locations or pixels) in the frames on a frame-by-frame basis. The low-frequency analysis module 202 can rely on different techniques to perform this task. In one approach, the low-frequency analysis module 202 can use any type of optical flow algorithm to identify the movement of points as a function of time. For instance, one illustrative and non-limiting optical flow algorithm is described in Michael J. Black, et al., "The Robust Estimation of Multiple Motions: Parametric and Piecewise-Smooth Flow fields," *Computer Vision and Image Understanding*, Vol. 63, No. 1, 1996, pp. 75-104. Alternatively, or in addition, the low-frequency analysis module 202 can use any type of feature-tracking algorithm to identify the movement of points as a function of time. For instance, one illustrative and non-limiting feature tracking algorithm is described in David G. Lowe, "Distinctive Image Features from Scale-Invariant Keypoints," *International Journal of Computer Vision*, Vol. 60, No. 2, 2004, pp. 91-110. The information regarding the movement of points constitutes low-frequency information.

Consider, for example, the movement of an illustrative point shown in FIG. 4 between frame T and frame T+K. For example, the frames T and T+K can represent I frames in a sequence of frames (and thus, the frame T+K need not directly follow the frame T.) This movement between frames can be expressed as a correspondence pair, $\text{Corr}_i=(T_i, T_i+K_i, x_{T_i}, x_{T_i+K_i})$, where $T_i$ and $T_i+K_i$ are integers. This means that a point at $x_{T_i}=(x_{T_i}, y_{T_i})$ in a first frame $I_{T_i}^{RS}$ is matched, tracked, or flowed to a point $X_{T_i+K_i}=(x_{T_i+K_i}, y_{T_i+K_i})$ in a second frame $I_{T_i+K_i}^{RS}$. In one implementation, both of the locations ($x_{T_i}$ and $x_{T_i+K_i}$) can represent integers. In another implementation, both of the locations can represent real values (e.g., that can be estimated with sub-pixel accuracy). In another implementation, one of the locations can represent an integer and the other can represent a real value.

FIG. 5 summarizes the above explanation in the form of a single-step procedure 500. In block 502, the low-frequency analysis module 202 determines the flow of points over the course of the frames of the input video information. As an outcome of its analysis, the low-frequency analysis module generates a plurality of point correspondences, $\text{Corr}_i$, as described above, which constitute low-frequency information.

B.2. Illustrative High-Frequency Analysis

FIGS. 6 and 7 provide additional detail regarding one illustrative implementation of the block 306 of FIG. 3, as performed by the high-frequency analysis module 204 of FIG. 2.

Beginning with FIG. 6, this figure FIG. 6 shows a plot in which a motion parameter $p_i(t)$ is assigned to a first axis and time (t) is assigned to a second axis. For example, the motion parameter may correspond to velocity in the y (row) direction of the frames. A high-frequency curve 602 plots a high-frequency motion of a point as a function of time.

However, at the beginning of its analysis, the high-frequency analysis module 204 is not given direct information regarding the path of high-frequency curve 602. The high-frequency analysis module 204 receives just the point correspondences $\text{Corr}_i$. More specifically, presume that the low-frequency analysis module 202 has tracked a particular point from a first frame to a second frame. The time at which the point appears in the first frame can be expressed as $T+\omega y_T$ and the time at which the point appears in the second frame can be expressed as $T+K+\omega y_{T+K}$. FIG. 6 shows these locations along the time axis, e.g., as demarcated by line 604 and line 606, respectively. The dashed lines (608, 610) indicate that behavior of a point in a nearby row is presumed to closely resemble the behavior of the point associated with lines 604 and 606.

Presume further that the point moved Δy between the first frame and the second frame. In the context of FIG. 6, this means that the area 612 under the high-frequency curve 602 has a value Δy. The high-frequency analysis module 204 expresses this integral relationship in the form of measurement constraints. The high-frequency analysis module 204 then uses an optimization technique to process the measurement constraints to probabilistically infer the high-frequency curve 602, essentially solving for the high-frequency information given the low-frequency information.

The following explanation sets forth a more formal basis for the above overview. Consider first the case of a translational motion model. As stated above, the translational model specifies that points have the same motion at any given time, but that this motion can change over time. In general, the motion of each point can be characterized by two motion parameters, $p_x(t)$ and $p_y(t)$, referring to velocity in the x direction and y direction, respectively.

First note that the high-frequency trajectory of a scene point can be expressed as x(t)=(x(t), y(t)). This expression maps a path of the point even through time periods in which it is not imaged. If the camera is jittering during the capture process, x(t) will vary rapidly between two subsequent frames T and T+1. For example, as described, FIG. 6 shows a high-frequency curve 602 with respect to one of the motion parameters, e.g., $p_y(t)$.

The high-frequency variation ($m^{hf}$) can be represented by $$\frac{dx}{dt} = m^{hf}(x; p(t)). \qquad (1)$$

The expression p(t) represents the collection of motion parameters used by a motion model. As said, for the translational model, the motion parameters are $p_x(t)$ and $p_y(t)$, so the high-frequency variation becomes:

$$m^{hf}(x;p(t))=(p_x(t),p_y(t)). \qquad (2)$$

Equation (1) defines a differential equation for x(t). To extract the high-frequency motion, this equation can be solved to yield the following continuous analytical solution for the translational model:

$$x(t) = x(t_0) + \int_{t_0}^{t} p(s)\,ds. \qquad (3)$$

This equation formally states the principle described above, namely that the macro per-frame motion represents the aggregate effects of the high-frequency motion that occurs between the frames. Here, the variable s represents time.

Given the above analysis, the constraint formulation module 212 (of FIG. 2) can plug each correspondence ($\text{Corr}_i$) into Equation (3) to generate a measurement constraint (MC) of the following form (for translational motion):

$$MC(\text{Corr}_i) = x_{T_i+K_i} - x_{T_i} - \int_{T_i+\omega y_{T_i}}^{T_i+K_i+\omega y_{T_i+K_i}} p(s)\,ds. \qquad (4)$$

In this case, $MC(\text{Corr}_i)$ ideally equals 0. Note that the integral is taken from the time that the point is imaged in the first frame $T_i+\omega y_{T_i}$ to the time at which it is imaged in the second frame $T_i+K_i+\omega y_{T_i+K_i}$. This means that the length of the interval is not exactly $K_i$. Each constraint can be viewed as specifying a value for the integral of unknown higher-resolution temporally varying motion parameters over a known interval. To repeat, the constraints from points in neighboring rows closely overlap each other.

The high-frequency analysis module 204 now constructs an energy function 214 that includes one or more terms that are based on the measurement constraints, as well as, optionally, one or more regularization terms. Regularization terms guide the optimization procedure based on specified assumptions. More specifically, for the case of translational motion, the energy function can take the following form:

$$\sum_{Corr_i} |MS(Corr_i)| + \lambda \sum_{j=1,2} \int \left|\frac{dp_j}{ds}\right| ds. \qquad (5)$$

This energy function regularizes the problem using a first order smoothness term that encourages the temporal derivative of the motion p to be zero, or at least small. The optimization module 216 can operate on this energy function in multiple passes to derive the desired high-frequency motion, e.g., by minimizing an energy metric generated by the energy function. In one approach the optimization module 216 uses a linear programming technique to perform this task.

In this process, the high-frequency analysis module 204 can use L1 norms to measure errors in both the measurements constraints and regularization terms. In one implementation, the choice of an L1 norm is appropriate because the measurement constraints are likely to contain a number of outliers, both due to independently moving objects and gross errors in the flow field. The optimization performed on the energy function of Equation (5) will have the effect of ignoring such independent motion.

According to another aspect, the high-frequency analysis module 204 can represent the continuous motion parameters with a uniform sampling across time. Further, the high-frequency analysis module 204 can use a piecewise constant interpolation of the samples when estimating the integral in the measurement constraints. With this representation, both the measurement constraints and the regularization term are linear in the unknown motion parameters.

FIG. 7 shows a procedure 700 which describes the operation of the high-frequency analysis module 204, and therefore serves as a summary of the explanation given above.

In block 702, the high-frequency analysis module 204 formulates the low-frequency information (expressed as point correspondences $Corr_i$) as measurement constraints (MC($Corr_i$)). The measurement constraints express known values of integrals of unknown high-frequency information.

In block 704, the high-frequency analysis module 204 formulates an energy function 214. The energy function 214 includes at least one term that is based on the measurement constraints and, optionally, at least one regularization term.

In block 706, the high-frequency analysis module 204 uses an optimization technique to operate on the energy function 214 in multiple passes to infer the high-frequency information, e.g., using linear programming, etc.

Consider next the case of a motion model that accommodates independently moving objects. In one approach, the high-frequency analysis module 204 can use a low-frequency model to characterize such independent motion; this is based on the observation that, in many instances, independently moving objects undergo relatively slow acceleration.

The counterpart of Equation (1) for the independent motion model is:

$$\frac{dx}{dt} = m^{hf}(x; p(t)) + m^{lf}_{[t]}(x). \qquad (6)$$

Here, $m^{lf}_{[t]}(x)$ refers to a low-frequency model, where $m_0^{lf}$, $m_1^{lf}$, ..., refer to low-frequency motion. This motion is constant within each frame, but spatially the variation is dense. The low-frequency model $m^{lf}_{[t]}(x)$ can be thought of as a per-pixel flow field, where each pixel flows with a temporally constant velocity between each pair of frames.

The low-frequency model $m^{lf}_{[t]}(x)$ makes it challenging to analytically solve Equation (6), as dependence on x is essentially arbitrary. To obtain an approximate solution, the high-frequency analysis module 204 can assume that the spatial variation in $m^{lf}_{[t]}(x)$ is small and treat this term as a constant. Based on this assumption, and using the translational model described above, the counterpart of Equation (3) becomes:

$$x(t) \approx x(t_0) + \int_{t_0}^{t} p(s)\,ds + (t - t_0) m^{lf}_{[t]}(x_{t_0}). \qquad (7)$$

The measurement constraints can be expressed as:

$$MC(Corr_i) = x_{T_i + K_i} - x_{T_i} - \qquad (8)$$
$$\int_{T_i + \omega y_{T_i}}^{T_i + K_i + \omega y_{T_i + K_i}} p(s)\,ds - (K_i + \omega y_{T_i + K_i} - \omega y_{T_i}) m^{lf}_{T_i}(x_{T_i}).$$

The energy function in Equation (5) can be modified by adding the following two regularization terms:

$$\gamma \sum_T \int \left\| \nabla m^{lf}_T(x) \right\|_1 dx + \epsilon \sum_T \left\| m^{lf}_T(x) \right\|_1 dx. \qquad (9)$$

The first term encourages the low-frequency model to vary smoothly across an image frame. The second term is used to resolve ambiguity between the low-frequency and high-frequency models. The term operates to favor the high-frequency model by adding a small penalty to non-zero independent motion. The subscript "1" in this equation refers to the use of the L1 norm.

Finally, consider the case of an affine motion model. An affine motion model describes dependent motion that differs for individual points, yet can still be characterized by a relatively small set of motion parameters, namely six motion parameters. The affine motion model can be used to characterize motion associated with rotation, zoom, etc. To simplify the explanation, the affine counterpart equations (described below) do not take into consideration independent motion; but more generally, the equations can be modified to include terms pertaining to independent motion.

To begin with, the affine motion parameters include a 2D vector $p(t)=(p_x(t), p_y(t))$ and a 2×2 matrix:

$$q(t) = \begin{pmatrix} q_1(t) & q_3(t) \\ q_2(t) & q_4(t) \end{pmatrix}. \qquad (10)$$

In one approach, the six affine parameters at each time t can be concatenated into a single vector. The counterpart to Equation (1) becomes:

$$\frac{dx}{dt} = m^{hf}(x; p(t); q(t)) = p(t) + xq(t). \qquad (11)$$

The counterpart to Equation (3) is:

$$x(t) \approx x(t_0) + \int_{t_0}^{t} [p(s) + x(t_0)q(s)] ds. \quad (12)$$

Equation (12) is approximate in the following way. First note that because Equation (12) derives from the differential definition in Equation (11), the parameter p=0 and q=0 correspond to the identity transformation. The corresponding finite difference affine transform can use the matrix:

$$\begin{pmatrix} 1+q_1(t) & q_2(t) \\ q_3(t) & 1+q_4(t) \end{pmatrix}. \quad (13)$$

The parameters of the composition of two affine transforms parameterized using Equation (13) are equal to the sum of the parameters, neglecting second order terms.

Given Equation (12), the measurement constraints become:

$$x_{T+K} - x_T = \int_{T+\omega y_T}^{T+K+\omega y_{T+K}} [p(s) + x_T q(s)] ds. \quad (14)$$

And the following regularization term can be added to the energy function:

$$\delta \sum_{j=1}^{4} \int \left| \frac{dq_j}{ds} \right| ds. \quad (15)$$

B.3. Correction Process

FIGS. 8 and 9 provide additional illustrative detail regarding one implementation of block 308 of FIG. 3, as performed by the HF-correction module 220 of FIG. 2. Recall that the purpose of the HF-correction module 220 is to reconstruct global shutter video information $I_T^{GS}$ (X,Y) based on rolling shutter video information $I_T^{RS}$(x,y). To perform this task, the HF-correction module 220 maps rolling shutter image values into global shutter pixels. Consider, for example, a particular global shutter pixel for a specified X, Y, and T (which are given integer values) in a global shutter image (frame). The HF-correction module 220 determines an (x, y) location within a rolling shutter image, extracts an image value (e.g., color value) at that location (through interpolation), and uses that image value to create the global shutter pixel. The HF-correction module 220 repeats this process to construct an entire simulated global shutter image, and, in aggregate, the global shutter video information. In the process, the HF-correction module 122 reduces motion-related artifacts that are present in the input video information.

FIG. 8 illustrates the above-described operation in graphical form. This figure shows a visualization of a 2D (y, t) slice through a 3D (x, y, t) space; that is, this figure shows only one pixel in each row of an image associated with a particular x slice through the 3D space. Assume that the goal at this particular juncture of processing is to create a global shutter pixel 802 that lies along a vertical plane at T+β. On the other hand, the rolling shutter pixels $I_T^{RS}$ (x, y) lie on a plane 804 defined by:

$$t = T + \omega y. \quad (16)$$

For the case of translational motion, the global shutter pixel 802 starts at a 3D location (X, Y, T+β) and moves along a path defined by:

$$\begin{pmatrix} x \\ y \end{pmatrix} = \begin{pmatrix} X \\ Y \end{pmatrix} + \begin{pmatrix} \int_{T+\beta}^{t} p_x(s) ds \\ \int_{T+\beta}^{t} p_y(s) ds \end{pmatrix}. \quad (17)$$

The $p_x(t)$ and $p_y(t)$ high-frequency motion is provided by the high-frequency analysis module 204. FIG. 8 shows an illustrative path 806 defined by Equation (17) (in the y dimension).

The correction process begins by solving the pair of simultaneous Equations (16) and (17). That is, plugging Equation (16) into Equation (17) yields:

$$\frac{t-T}{\omega} = Y + \int_{T+\beta}^{t} p_y(s) ds. \quad (18)$$

The correction process then uses Equation (18) to first determine an intersection time $t_{int}$ at which the high-frequency motion path 806 intersects the plane 804 associated with the rolling shutter pixels. FIG. 8 represents this intersection as occurring at crossing point 808. The intersection time $t_{int}$ can be determined by stepping through the representation of the motion parameters p(t), considering each pair of samples in turn and approximating the integral in Equation (18). More specifically, for a time interval between each pair of motion samples, Equation (18) can be considered linear in the unknown t. This facilitates checking to determine whether there is a solution in a particular interval under consideration. More specifically, the HF-correction module 220 can make a single pass through each neighboring pair of motion samples, with an early termination if a solution is found. If no solution is found, the pixel may have moved outside the image frame.

Once the HF-correction module 220 determine the intersection time $t_{int}$, it can use Equation (17) to determine the (x, y) location in the rolling shutter image. The HF-correction module 220 can then use any interpolation technique (e.g., a bi-cubic interpolation technique) to determine an image value at this location. As stated above, the HF-correction module 220 uses this value to create the global shutter pixel 802. For the case of translational motion, the solution of Equation (18) for t is independent of X; thus, this process can be applied once per row, rather than for every pixel in the row.

FIG. 9 summarizes the above explanation in flowchart form. More specifically, the procedure 900 shown in FIG. 9 describes processing performed to construct a particular global shutter pixel. The same operations can be repeated to construct an entire frame of global shutter video information.

In block 902, the HF-correction module 220 determines the intersection time ($t_{int}$) at which the path 806 of the global shutter pixel 802 intersects the rolling shutter plane 804.

In block 904, the HF-correction module 220 determines an (x, y) location in a rolling shutter image based on the intersection time.

In block 906, the HF-correction module 220 performs interpolation to determine an image value at the identified location (x, y), which it uses to create the global shutter pixel.

As stated, Equation (17) pertains to the translational model. The counterpart equation for the motion model that accommodates independent motion is:

$$x = X + \int_{T+\beta}^{t} p(s)\,ds + (t - T - \beta)m_T^{1f}(X). \quad (19)$$

Note that the time of intersection of this path with the plane 804 of rolling shutter pixels in Equation (16) is no longer independent of X. The HF-correction module 220 therefore determines the intersection for each pixel, rather than just once for each row. To reduce this processing burden, the HF-correction module 220 can solve for this intersection on a down-sampled mesh of video information, followed by up-sampling.

The counterpart of Equation (17) for the case of affine motion (without independent motion) is:

$$x = X + \int_{T+\beta}^{t} [p(s) + Xq(s)]\,ds. \quad (20)$$

Like the case of independent motion, the intersection of this path with the plane 804 of rolling shutter pixels is different for different X.

B.4. Calibration Process for Selecting the Capture Parameter

To repeat, the capture parameter ω defines the temporal separation between the capture of successive rows. In some cases, the value of ω can be determined based on physical specification information associated with the camera. In other cases, the video information may originate from an unknown source, and therefore the value of ω may be initially unknown. The question then arises: what value is appropriate to use for ω. It is empirically and theoretically noted that the procedure 300 described in FIG. 3 is relatively robust with respect to different selections of ω. This means that the choice of a non-optimal ω may add small jitter to the output video information in the form of affine warp. But such a choice is not expected to add large artifacts.

Figure 10:
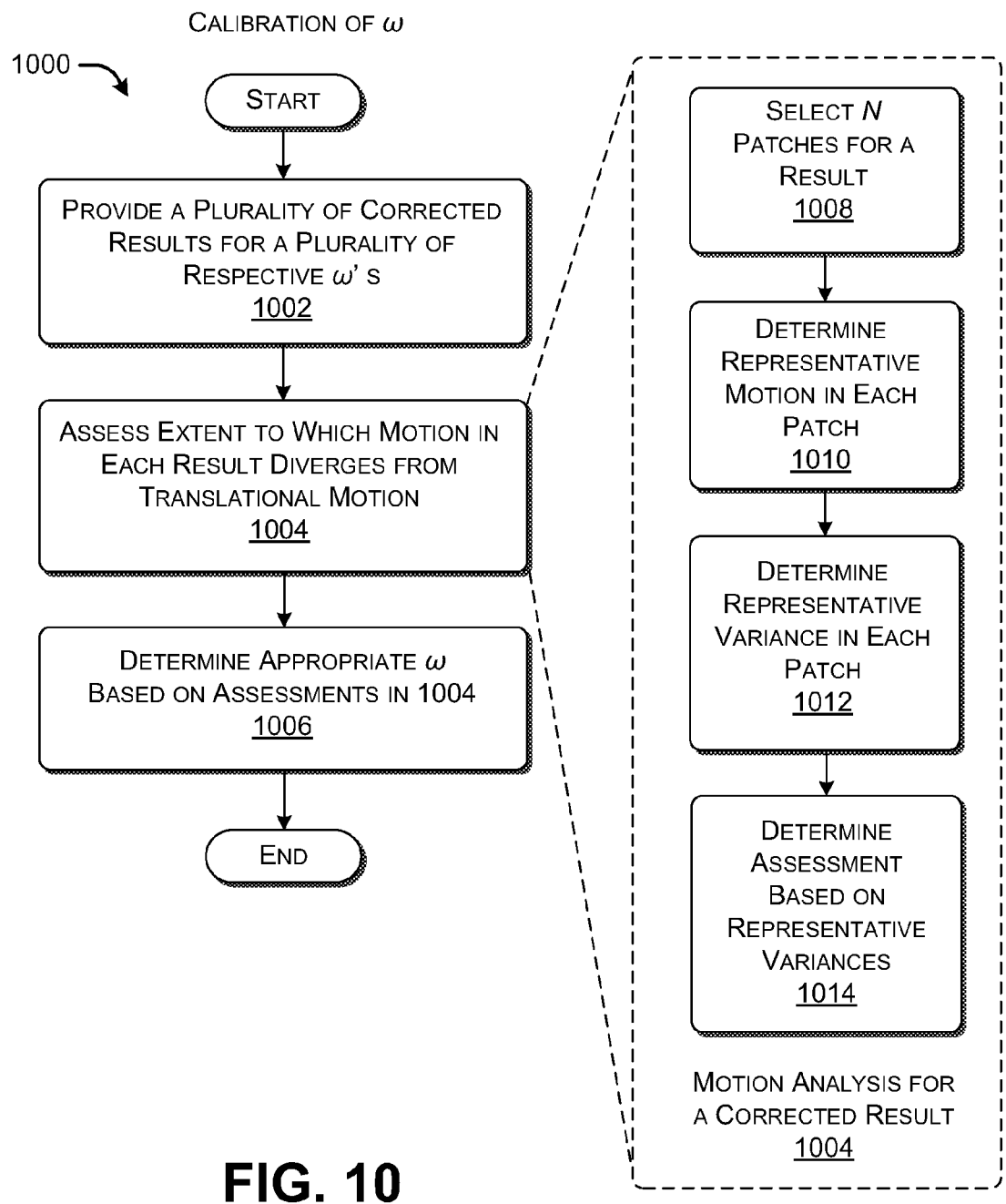
FIG. 10 is an illustrative procedure for calibrating a capture parameter, where the capture parameter defines a time interval between the capture of two successive lines of video information.

FIG. 10 shows a procedure 1000 for automatically selecting an appropriate value of ω. In other words, FIG. 10 shows a process for automatically calibrating ω.

In block 1002, the calibration module 218 performs the procedure 300 of FIG. 3 for a plurality of different values of ω, e.g., where ω∈[0, 1/(M−1)]. This yields a plurality of output video information results, referred to below for brevity as correction results. The corrected results can be generated by processing an input video sequence of any length for different ω's.

In block 1004, the calibration module 218 makes an assessment of the extent to which the motion in each of the correction results diverges from translational motion. In other words, this assessment determines an extent to which the motion in each corrected result is more complex than pure translational motion. This analysis can be performed on a portion of each corrected result having any duration, such as, in one case, a segment a few seconds in length. Moreover, in one case, block 1004 can be performed for a portion that is particularly identified as containing wobble-type artifacts.

In block 1006, the calibration module determines an appropriate value for ω based on the analysis provided in block 1004, e.g., by selecting a ω which provides a minimum deviation from translational motion.

The right portion of FIG. 10 describes one approach for performing block 1004 of FIG. 10. This series of operations is described for a representative corrected result. The same process can be performed for other corrected results.

In block 1008, the calibration module 218 selects a number of patches within a video sequence of any length, taken from the corrected result.

In block 1010, the calibration module 218 determines a representative motion associated with each patch. For example, the calibration module 218 can use an optical flow technique (or some other technique) to determine the motion in each patch. The calibration module 218 can then compute an average (or median) of such motion for each respective patch.

In block 1012, the calibration module 218 determines a representative deviation for each patch. For example, for each patch, the calibration module 218 can determine an extent to which each pixel diverges from the representative (e.g., average) motion for that patch (as computed in block 1010). The calibration module 218 can then form a representative variance (e.g., a median variance) of these individual pixel variances. In other words, the calibration module 218 determines, in general, to what extent pixels in each patch diverge from the patch's average motion.

In block 1014, the calibration module 218 computes a final assessment for each corrected result, such as by taking the average of the median values determined in block 1012.

In one environment, a value of approximately 0.75 (relative to the maximum possible value of 1/(M−1)) is empirically shown to be a reasonable setting for ω.

C. Representative Processing Functionality

FIG. 11 sets forth illustrative electrical data processing functionality 1100 that can be used to implement any aspect of the functions described above. With reference to FIG. 2, for instance, the type of processing functionality 1100 shown in FIG. 11 can be used to implement any aspect of the system 200. In one case, the processing functionality 1100 may correspond to any type of computing device that includes one or more processing devices.

The processing functionality 1100 can include volatile and non-volatile memory, such as RAM 1102 and ROM 1104, as well as one or more processing devices 1106. The processing functionality 1100 also optionally includes various media devices 1108, such as a hard disk module, an optical disk module, and so forth. The processing functionality 1100 can perform various operations identified above when the processing device(s) 1106 executes instructions that are maintained by memory (e.g., RAM 1102, ROM 1104, or elsewhere). More generally, instructions and other information can be stored on any computer readable medium 1110, including, but not limited to, static memory storage devices, magnetic storage devices, optical storage devices, and so on. The term computer readable medium also encompasses plural storage devices.

The processing functionality 1100 also includes an input/output module 1112 for receiving various inputs from a user (via input modules 1114), and for providing various outputs to the user (via output modules). One particular output mechanism may include a presentation module 1116 and an associated graphical user interface (GUI) 1118. The processing functionality 1100 can also include one or more network interfaces 1120 for exchanging data with other devices via one or more communication conduits 1122. One or more communication buses 1124 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, using a computer having memory and one or more processing devices, for reducing artifacts in video information produced by a rolling shutter technique, comprising:
receiving input video information that contains artifacts, the input video information being generated using the rolling shutter technique;
determining low-frequency information from the input video information, the low-frequency information describing low-frequency motion exhibited in the input video information;
inferring high-frequency information from the low-frequency information, using a motion model, the high-frequency information describing high-frequency movement associated with the input video information, said inferring the high-frequency information comprises:
formulating the low-frequency information as measurement constraints, the measurement constraints expressing known values of integrals of unknown high-frequency information;
formulating an energy function that includes at least one term that is based on the measurement constraints; and
using an optimization technique to estimate the high-frequency information by operating on the energy function;
correcting the input video information based on the high-frequency information, to generate output video information in which the artifacts contained therein are reduced; and
providing the output video information.

2. The method of claim 1, wherein said determining of the low-frequency information comprises determining movement of points from one frame of the input video information to a next frame, wherein information regarding the movement comprises the low-frequency information.

3. The method of claim 2, wherein said determining of the movement with respect to low frequency information comprises a feature-tracking technique.

4. The method of claim 2, wherein said determining of the movement with respect to low frequency information comprises an optical flow technique.

5. The method of claim 1,
wherein said inferring of the high-frequency information is governed by the motion model which expresses a type of motion in the input video information.

6. The method of claim 1, wherein said formulating of the energy function is based on at least one regularization term.

7. The method of claim 5, wherein the motion model is a translational model that models translational motion in the input video information.

8. The method of claim 5, wherein the motion model is an affine model that models affine motion in the input video information.

9. The method of claim 5, wherein the motion model is an independent motion model that accommodates presence of independently moving objects in the input video information.

10. The method of claim 1, wherein the output video information simulates video information captured using a global shutter technique, wherein each frame of the output video information includes a plurality of global shutter pixels that are constructed from rolling shutter pixels provided by the input video information.

11. The method of claim 10, wherein said correcting comprises, for each global shutter pixel:
determining an intersection time at which the global shutter pixel intersects a plane associated with capture of the input video information using the rolling shutter technique;
using the intersection time to determine a location within a rolling shutter image; and
determining an image value at the location, and using the image value to create the global shutter pixel.

12. The method of claim 1, wherein a camera that provides the input video information is characterized by a capture parameter that describes a time interval between capture of two successive lines of video information, further comprising determining an appropriate value for the capture parameter by:
providing a plurality of output video information results, constituting corrected results, using different respective capture parameter values;
providing an assessment, for each corrected result, which reflects an extent to which motion in that corrected result diverges from translational motion, to provide a plurality of assessments; and
determining an appropriate capture parameter value based on the plurality of assessments.

13. The method of claim 12, wherein said providing of the assessment for a corrected result comprises:
determining a plurality of patches;
determining, for each patch, a representative motion;
determining, for each patch, a representative extent to which pixels in the patch vary from the representative motion in the patch, to provide a representative variance; and
determining the assessment based on a plurality of representative variances associated with the plurality of respective patches.

14. A computer readable storage medium for storing computer readable instructions, the computer readable instructions providing analysis functionality when executed by one or more processing devices, the computer readable instructions comprising:
logic configured to determine low-frequency information from input video information, the low-frequency information describing low-frequency motion exhibited in the input video information, the input video information being generated using a rolling shutter technique; and
logic configured to infer high-frequency information from the low-frequency, using a motion model, the high-frequency information describing high-frequency movement associated with the input video information, said logic configured to infer the high-frequency information comprises:
logic configured to formulate the low-frequency information as measurement constraints, the measurement constraints expressing known values of integrals of unknown high-frequency information;
logic configured to formulate an energy function that includes at least one term that is based on the measurement constraints; and
logic configured to use an optimization technique to estimate the high-frequency information by operating on the energy function.

15. The computer readable storage medium of claim 14, wherein said logic configured to determine the low-frequency information comprises logic configured to determine movement of points from one frame of the input video information to a next frame, wherein information regarding the movement constitutes the low-frequency information.

16. The computer readable storage medium of claim 14, wherein said logic configured to infer the high-frequency information is governed by the motion model which expresses a type of motion in the input video information.

17. The computer readable storage medium of claim 16, wherein the motion model is a translational model that models translational motion in the input video information.

18. The computer readable storage medium of claim 16, wherein the motion model is an affine model that models affine motion in the input video information.

19. The computer readable storage medium of claim 16, wherein the motion model is an independent motion model that accommodates presence of independently moving objects in the input video information.

20. A system, implemented using a computer having memory and one or more processing devices, for reducing artifacts in video information produced by a rolling shutter technique, comprising:

a low-frequency analysis module configured to determine low-frequency information from input video information, the low-frequency information describing movement of points from one frame to a next frame in the input video information;

a high-frequency analysis module configured to infer high-frequency information based on the low-frequency information, using a motion model, the high-frequency information describing high-frequency movement associated with the input video information, the high-frequency analysis module comprising:

logic configured to formulate the low-frequency information as measurement constraints, the measurement constraints expressing known values of integrals of unknown high-frequency information;

logic configured to formulate an energy function that includes at least one term that is based on the measurement constraints, together with at least one regularization term; and logic configured to use an optimization technique to estimate the high-frequency information by operating on the energy function, a correction module configured to correct the input video information based on the high-frequency information, to generate output video information in which artifacts contained therein are reduced.

* * * * *